W. L. SCOTT.
ADJUSTABLE COMBINATION SHIELD ATTACHMENT FOR CAMERAS.
APPLICATION FILED MAY 21, 1912.
1,084,234.
Patented Jan. 13, 1914.
2 SHEETS—SHEET 1.
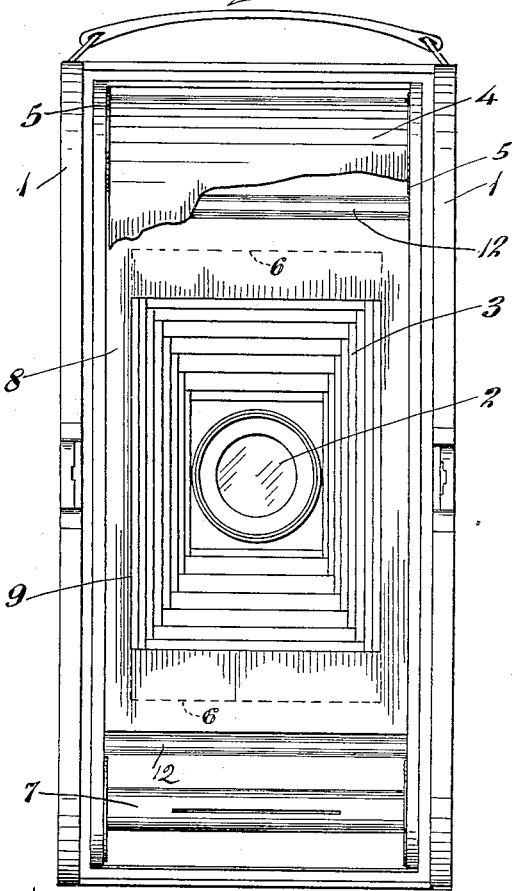
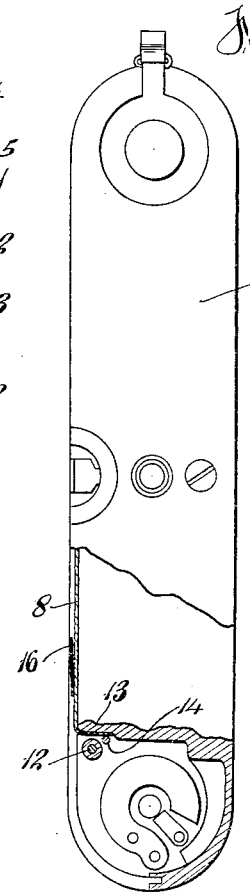
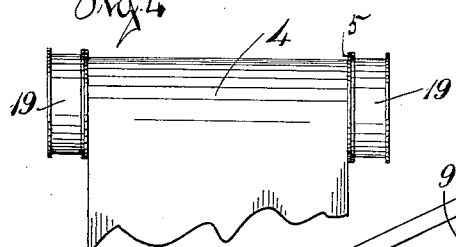
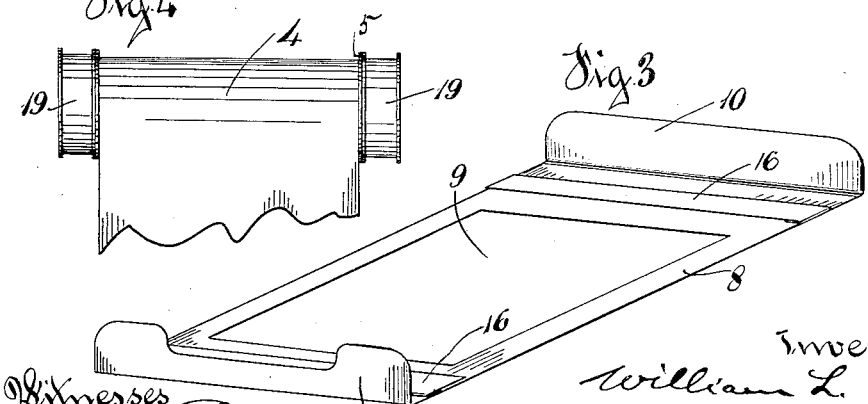
Witnesses
Oliver Shorman
Goldie Gordon
Inventor
William L. Scott
By
James N. Ramsey
Attorney

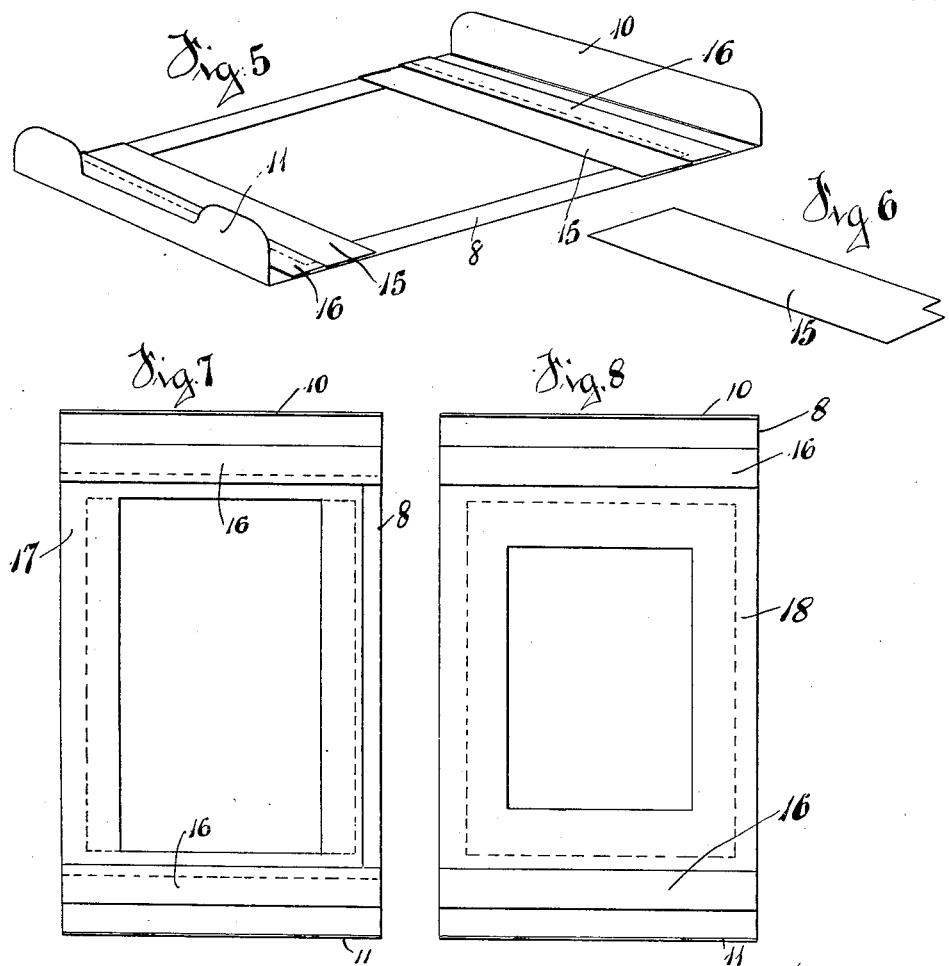

UNITED STATES PATENT OFFICE.

WILLIAM L. SCOTT, OF CINCINNATI, OHIO.

ADJUSTABLE COMBINATION-SHIELD ATTACHMENT FOR CAMERAS.

1,084,234.  Specification of Letters Patent.  Patented Jan. 13, 1914.

Application filed May 21, 1912. Serial No. 698,676.

*To all whom it may concern:*

Be it known that I, WILLIAM L. SCOTT, a citizen of the United States, residing at Cincinnati, in the county of Hamilton and State of Ohio, have invented certain new and useful Improvements in Adjustable Combination-Shield Attachments for Cameras, of which the following is a specification.

My invention relates to adjustable combination shield attachments for cameras particularly adapted to be used on film cameras.

The object of my invention is to provide a shield which can be placed in the back of the camera and in front of the film in order that various sizes of films may be efficiently used on the same camera.

Another object of my invention is to provide a combination shield for cameras which can be adjusted to accommodate any size film smaller than the film which the camera ordinarily requires and to provide means for accommodating the smaller film spools.

In the art of photography, it is often found desirable to take various sizes of pictures, due sometimes to the subjects which are to be taken and sometimes to the expense of the films to be used. To do this heretofore it has been necessary to purchase different size cameras for each size film to be used and it is, therefore, the paramount object of my invention to provide an attachment for the ordinary size camera which when used with the camera will render the camera capable of accommodating any size of film smaller than the film ordinarily used by the camera.

My invention consists broadly in a thin shield plate adapted to be mounted in the camera, consisting of a series of auxiliary plates, the different parts of said shield being adapted to be combined in various ways so as to accommodate any size film and means for lengthening the film spools of the smaller films when they are used with the shield.

My invention consists more specifically in a shield having an aperture therein, flanges on the ends thereof, strips at the end thereof forming slots, a series of plates adapted to enter said slots, said plates having openings therein smaller than the opening in said shield and spacing rollers adapted to be placed on the end of the film spools.

In the accompanying drawings, which serve to illustrate my invention and which show a preferred construction: Figure 1 is a view of a film camera of a common type with the back taken off, exposing the film which is partly broken away; Fig. 2 is a side elevation of same, part being broken away for the sake of clearness; Fig. 3 is a detail perspective view of the shield plate adapted to be mounted in the back of said camera; Fig. 4 is a detail view of a film spool showing the spacing rollers on each side thereof; Fig. 5 is a perspective view of the shield plate showing top and bottom strips mounted thereon for the purpose of diminishing the size of the aperture in the shield plate to accommodate a smaller size film; Fig. 6 is a detail view of one of the strips mounted on the shield shown in Fig. 5; Figs. 7 and 8 are views of the shield having plates mounted thereon diminishing to smaller degrees the opening in the main shield to accommodate different size films; Fig. 9 is a detail view of a spacing roller adapted to be used on the end of the film spool; Fig. 10 shows one of the spacing spools having an extension on the end thereof corresponding to the ordinary key extension on the camera; Fig. 11 is a front view of same showing the slot or recess in the end thereof which the key extension engages; Fig. 12 is a plan view of the front portion of a camera showing the finder; and Fig. 13 shows a view of a series of small finder shields which are used in connection with the finder shown in Fig. 12.

Referring more particularly to the drawings, 1 illustrates a camera having a lens 2 which is provided with a folding bellows 3. The film 4 is placed in the usual manner on the film spool 5 and the spool is mounted in the camera in the ordinary manner. The film is then stretched over the opening 6 and fastened to the empty spool 7 shown at the lower portion of Fig. 1. The spool 7 is keyed to the operating crank in the ordinary well known manner so that when the operating crank is turned the film is moved across the opening 6 of the camera.

A shield plate 8 is shown mounted in Fig. 1 and has an opening 9 in the center thereof said opening being shorter than the ordinary opening used in the camera. It is readily seen that this allows for the use of a smaller film such as a 3¼ inch by 4¼ inch film, whereas the opening 6 in the camera as shown will accommodate a 3¼ inch by 5½ inch film. The 3¼ inch by 5½ inch film camera is illustrated because of the fact that it has been found to be the most useful camera for all purposes. However, the larger size cameras may readily be supplied with my improved attachment.

The shield plate 8 is provided with flanges 10 and 11, the flanges being adapted to be inserted between the rollers 12 and the frame work 13 of the camera. On cameras of this type stay rods or brace rods 14 are provided adjacent the rollers 12 and the flanges 10 and 11 are adapted to extend between said rods 14 and the frame 13 of the camera thereby allowing free movement of the rollers 12 over which the films are adapted to pass. Thus it is evident that the shield can be placed on any of these cameras without necessitating any change in the construction of same.

If it is desired to use a still smaller sized film, the next in size being the 3½ inch by 3½ inch film, the strips 15 shown in Fig. 6 are used and are preferably inserted under the strips 16 which are mounted on the main shield plate 8. These strips 16 are permanently fastened along each edge at one end in order to form a suitable slot between said strip and the shield plate 8 for accommodating the strips 15 and the smaller plates 17 and 18 shown in Figs. 7 and 8 respectively. When these strips 15 are placed in the slots provided by the strips 16 the opening in the entire shield is then diminished to the proper size to accommodate the smaller film.

Fig. 7 shows the main shield plate with a still smaller plate mounted thereon to accommodate a still smaller size film such as a 2½ inch by 4½ inch film and Fig. 8 shows still another size plate 18 mounted on the shield plate in the same manner as the strips 15 are mounted on the shield plate in Fig. 5. Thus by simply inserting a plate with different size openings therein I am enabled to provide for different size films to be used in the camera.

The spools upon which the films are rolled vary somewhat in size and it is, therefore, necessary to provide extension rollers 19 and 20 shown in Figs. 9, 10 and 11. The rollers 19 are provided with a recess 21 in one end and an extension 22 on the other, the recess 21 being provided for the accommodation of the extension which is found on the camera while the extension 22 takes the place of the extension on the camera and enters the recess on the spool roll thereby simply forming an extension for the spool. One end of the camera is provided with a key extension to enter a suitable slot in the film spool so that when the key extension is turned the spool is turned and the film is wound up upon said spool. To lengthen this spool I provide the roller 20 having a slot 23 therein to accommodate the key extension of the camera and I also provide the extension 24 on said roller to take the place of the extension on the camera thereby forming an extension for the spool which is placed at this end of the camera.

In order to render this system more practical and to obtain more efficient results from the attachment I provide a series of small finder shields 25 shown in Fig. 13 each having a different size opening therein and adapted to fit the finder 26 on the camera shown in Fig. 12.

The operation of the device is as follows: The operator first determines which size film he wishes to use. He thereupon adjusts the shield plate 8 so as to accommodate the proper size film and then mounts said shield plate in the manner described, in the back of the camera. If the camera spool needs lengthening he places the spacing rollers on the ends thereof and mounts same in the camera, stretching the film over the shield plate 8 and fastening said film to the roller at the other end of the camera just as he would if the shield plate was not mounted therein. The back of the camera is then placed in position and the camera is ready to be used.

The shield plates are all made of a thin metal, preferably of thin metal sheets so that the plates can be readily inserted between the film and the back of the camera without necessitating any change in the construction of the camera case.

Any number of apertures may be provided in the back of the camera in order that the different films may be stopped at the proper point to cause it to register properly with the shield plates and the lens of the camera. The films may also be marked if desired so that all size films will register at the same apertures in the back of the camera. These apertures, as is well known, are provided with opaque covering to prevent the film from becoming destroyed by exposure. The films as they are now manufactured would necessitate the provision of three apertures in the back of the camera, one at each end of same and one adjacent the center.

It is readily seen that the device has many advantages inasmuch as it is possible to take a great variety of sizes of pictures with the same camera and with the same lens. This device is particularly well adapted for use on cameras which have expensive lens therein inasmuch as smaller pictures may be taken with the same expensive lens and the films will be a great deal less expensive.

Many modifications in the details of my invention might be made without departing from its spirit and scope as for instance the shield may be constructed in a different manner so as to accommodate the different size films; they may also be constructed to conform to any make or type of camera.

What I claim as new and desire to secure by Letters Patent is:

1. In a combination shield for cameras, a shield plate, flanges thereon, a plurality of strips mounted thereon, one of a series of plates adapted to be mounted on said shield plate under said strips said plates having apertures therein graduated in size, substantially as and for the purposes set forth.

2. In combination, a thin shield plate for cameras having an aperture therein, a film or plate adapted to register with said aperture, one of a series of plates adapted to be mounted on said shield plate for the purpose of diminishing the size of said aperture and means whereby said thin shield plate may be detachably secured to said camera.

WILLIAM L. SCOTT.

Witnesses:
JAMES N. RAMSEY,
GOLDIE GORDON.

---

Copies of this patent may be obtained for five cents each, by addressing the "Commissioner of Patents, Washington, D. C."